May 17, 1966 R. G. GIDLOW ET AL 3,251,695

METHOD OF AGGLOMERATING A DRY PULVERULENT FLOUR BASE MATERIAL

Filed June 17, 1960

UNTREATED PARTICLES

AGGLOMERATE

SECTION THRU AGGLOMERATE

INVENTORS
ROLF G. GIDLOW
JOLYON A. STEIN
BY Williamson & Palmatier
ATTORNEYS 3,251,695
METHOD OF AGGLOMERATING A DRY PUL-
VERULENT FLOUR BASE MATERIAL
Rolf G. Gidlow, North St. Paul, and Jolyon A. Stein, Minneapolis, Minn., assignors to The Pillsbury Company, Minneapolis, Minn., a corporation of Delaware
Filed June 17, 1960, Ser. No. 36,942
2 Claims. (Cl. 99—94)

This application is a continuation-in-part of application Serial No. 646,215, filed March 15, 1957, and now abandoned.

This invention relates to agglomerated mixtures based on cereal flours and related products, and in particular to dry pre-mixes containing flour as an essential ingredient thereof and which also contain limited amounts of other ingredients which are capable of functioning as a binder for agglutinating the mixture if properly treated and handled, with particular but not limited emphasis on pre-prepared dry food mixes.

As a convenience to the housewife, many food preparations which were formerly assembled and mixed at home immediately prior to use have now been made available in pre-prepared mixes of one form or another so as to dispense with the time consuming messy assembling, measuring and mixing of the necessary ingredients at home to save both time and effort in the preparing of the food. One class or group of these pre-mixed food products which have become popular are the prepared mixes for pancakes, waffles, bread and the like which consist essentially of flour in particulate form having a small percentage or proportion of other ingredients including binders as sugar in dry particulate form admixed therewith which are capable of functioning as agglutinates for agglomerating the mixture if suitably wetted to place them in an adhesive state or condition. This type of food mix, as in all food products having flour as a substantial ingredient, have been plagued with certain undesirable physical characteristics such as being very dusty, very poorly dispersible in liquids when formed into batters and the like, having the tendency to cake or ball in large masses and being difficult to handle and package due to poor flow characteristics, and so forth.

We have discovered that the best solution to date to these problems lies in agglomerating these flour base food mixes, which agglomeration if properly carried out according to the teachings of this disclosure and invention forms an agglomerated product which more readily disperses into batter form when mixed with a liquid, is free-flowing in nature to facilitate handling and packaging, has a considerably lower dust factor than the same material in an unagglomerated state and maintains a more uniformly viscous batter over a longer period of time than similar non-agglomerated mixes, which accomplishments generally constitute most of the important objects of this invention.

However, another objective relates to improving the physical characteristics of the batter and the resultant baked or otherwise cooked food and product emanating therefrom by improving the batters ability to develop and/or entrain or entrap air therein. The viscosity of a batter rises as the dispersion of the mixed particles becomes more complete. Until such time as the batter has attained a minimum viscosity, it is difficult to retain small air bubbles in the batter. If the viscosity is never brought to its proper point, then much of the air produced by mechanical beating as well as chemical leavening may be lost through rise and escape of the bubbles. The enrtainment of small air bubbles itself aids in increasing the viscosity of the batter and, hence, can create a self-propagating cycle where the more viscous batter again tends to retain more of the small air bubbles in suspended condition. Air becomes important since most batters require same external air entrainment. The present invention contemplates a dry mix of such physical quality as will rapidly disperse in the batter liquid and will become sufficiently viscous in time to entrain a portion of its own tiny bubbles and to render easy the addition of more entrained air through the expedient of a few additional beating strokes. It appears that the voids of the agglomerates provide rapid access to the batter liquid prior to the formation of a wet and sticky water resistant layer which would be apt to form over the surface of a lump or ball of the powdered mix in the absence of the void structure. The sub-agglomerates or particles stick together to form each agglomerate, then break away from the larger agglomerates but are, by that time, surrounded with liquid and capable of becoming completely wetted and easily dispersed into a homogeneous suspension in the beating process. The rapid complete dispersion, as before noted, promotes a rapid increase in viscosity. The air entrained in tiny voids in the agglomerates is released simultaneously with the complete dispersion thereof and the rapidly increased viscosity will prevent their association into larger bubbles and the escape of any appreciable quantity of entrained air to the surface of the batter. The batter, in the condition just described, is now capable of holding additional air which can be introduced easily by beating the batter with a few additional strokes of a spoon or paddle.

A good batter should have a multiplicity of tiny bubbles dispersed throughout to form nuclei for growth when the chemical leavening constituent adds gas thereto during the baking or cooking process. The greater the number of initial bubbles and the smaller the size thereof, the finer will be the grain and texture of the finished food product. Conversely, if the bubbles are few and large, then the added gas will not be uniformly distributed but will compound the coarse character of the finished product.

Although agglomeration has been attempted in other un-realted fields of endeavor such as in the agglomerating of dried milk powders and the like, no one has to date, within the applicants' knowledge, ever solved the aforementioned problems relating to flour base mixtures nor provided a satisfactory agglomerated flour product of any type nor has anyone produced a successful agglomerated flour base food mix such as a pancake or waffle mix nor taught or suggested a method of accomplishing this end.

In the course of attacking and solving the problem of succesfully agglomerating flour base products, which constitutes a general object of this invention, we have found that the methods or processes of agglomeration and the structural characteristics of the agglomerates formed vary according to the constitution of the particular type of flour base product involved. We have further found that one of the most significant factors governing the method of treatment and the individual structural characteristics of the agglomerates lies in the make-up or constituency of the material to be agglomerated, with particular emphasis on whether the relatively insoluble flour in the product is to be self-agglomerating, or whether sufficient readily soluble ingredients (such as sugar or salt) capable of functioning as agglutinants or binders are present in the material to be agglomerated. If such functional agglutinants are present, the extent or amount to which they are present also has a significant bearing on the manner of treatment and the agglomerate structure formed. Because of these differences in constitutional make-up, manner of treatment, and structural characteristics of the agglomerated end product, the subject of successful agglomeration of flour base products has been sub-divided into three separate co-pending applications (of which this application is one), the other of said copending applications being Serial No. 36,946 filed June 17, 1960, and Serial No. 36,823 also filed June 17, 1960 now abandoned, all of which constitute continuations-in-part of a presently co-pending application entitled, "Quickly Dispersible Food Mix for Batter Products," S.N. 646,215, filed March 15, 1957, now abandoned. This disclosure relates to those flour base products having functional readily soluble agglutinates admixed with the flour particles in sufficient quantity to bind the particles of the mixture, and most particularly to that group of flour base mixtures (such as pancake and waffle mixes) having a limited or intermediate amount of agglutinate such as sugar present, generally in the range of 3.5 to 15% although the field of application of this invention is not to be limited thereto, as will be apparent from what is presented hereinafter.

Therefore, a general object of this invention is an agglomerated flour base food mix having admixed therewith a limited amount of functional agglutinating ingredient such as sugar which is readily soluble and capable of functioning as a binder to combine the ingredients thereof into a porous agglomerate characterized by a multiplicity of voids and interstices.

Another object is to provide a method of treating flour base mixtures containing functional amounts of readily soluble aggultinants so as to convert the mixture into readily dispersible, free-flowing, porous agglomerates of tightly clustered particles bonded together by the soluble agglutinate and generally having a loose non-compacted bulk density equal to or greater than that of the unagglomerated mixture.

To aid in understanding the instant invention, certain drawings are presented herewith which include:

FIG. 1 which is a diagrammatic representation of apparatus which may be successfully employed to carry out the methods and produce the agglomerates of this invention;

Figure 3:
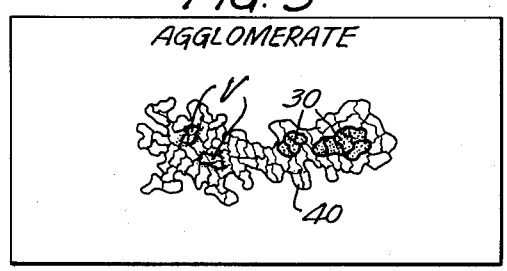
FIG. 3 is a line drawing of a typical type of porous agglomerate formed from a mixture such as that shown in FIG. 2 by the method of our invention and as viewed under a microscope.
Figure 4:
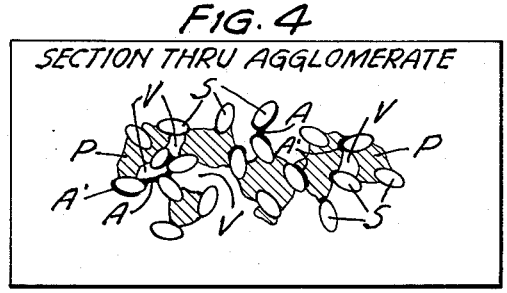
FIG. 4 is a cross-sectional view of a typical agglomerate such as that shown in FIG. 3 depicting the interior of the agglomerates of our invention.

The agglomerates of the instant invention are characterized by the fact that the particles constituting the mix are held together not by glutenized protein as when plain flour particles are agglomerated (as taught in one of the aforementioned presently co-pending applications) but rather by readily soluble agglutinating particles such as sugar from which adhesive film was developed by dispersion of the particles in a humid atmosphere, preferably of steam, and which were then thoroughly intermixed with the other ingredients constituting the mix and vigorously agitated to bring the mix particles into contact with one another and couple them together by means of the adhesive into a porous agglomerate. These agglomerates are best depicted in FIGS. 3 and 4 of the accompanying drawings. Attention is called to the fact that the agglomerates of this invention are tightly clustered together and form a porous structure having a large number of voids and interstices therein which enable a liquid to rapidly penetrate to all portions thereof and quickly dissolve the readily soluble agglutinate and release the particles constituting the agglomerate to the batter. The interstices and voids also materially aid in entrapping air in the batter, as noted hereinbefore, to quickly develop and maintain a batter of desired viscosity and an end product of fine grain and texture, this aspect of air entrapment having particular pertinency to those mixtures which are to be employed in the making of leavened baked products such as cakes and the like. The agglomerates of this invention are further characterized by the fact that the non-soluble ingredients are adhered to the soluble ingredients through the medium of the adhesive solution or sticky syrup which was formed on the surface of the soluble ingredients (sugar) during the wetting phase of the agglomeration procedure, the insoluble ingredients adhering to the wetted surface of the soluble ingredients to form the agglomerates when brought into contact with one another during turbulent agitation thereof, the homogeneous agglomerates formed permitting entrapment of air and utilization of capillary action when added to and dispersed in a liquid such as to form a batter. Or, as sometimes happens, particularly when the agglutinant such as sugar is in very finely divided form, the agglutinant particles may dissolve in the moisture and form a sticky adhesive syrup which coats the other particles and serves as the adhesive to hold the particles together.

To accomplish the agglomerated structure shown in the accompanying drawing and described herein, the procedure is followed as outlined hereinafter in order to produce satisfactory agglomerates. The method comprising this invention consists of grinding or otherwise reducing, if necessary, the ingredients constituting the mix to the desired particulate size and forming a homogeneous mixture thereof. The particles of the food mix to be agglomerated are then dispersed in a moist atmosphere, preferably a vaporous one of steam, in order that the surface of the binder or sugar particles may be moistened, causing the surface of the sugar particles to dissolve in the moist film condensed on the surface thereof so as to effect an adhesive characteristic in the film thereon. The agglutinating particles such as sugar having the adhesive film thereon are then brought into contact with the other particles in the mixture such as will cause these other particles to adhere thereto and form the desired agglomerates. Because of the highly soluble nature of the binder, it is necessary that the amount of moisture added to the mix be carefully controlled to prevent over-moisturizing of the soluble agglutinates or sugars, since an adhesive surface film is sufficient to effect the agglomeration. Where steam is employed, the mixture being agglomerated is maintained at a cooler temperature than the steam, and below the boiling point of water in order that the steam will condense on the particles when coming in contact therewith, dissolving a portion of the agglutinate to form an adhesive, sticky film on the surface of the particle. Steam is the preferred means of moisturizing the mixes to be agglomerated since it is easier to control the amount of moisture added to the particles when condensation is employed.

Control of the amount of moisture added to the mixture during agglomeration is important not only from the standpoint of the readily soluble agglutinate, but also with regards to the leavening agent, when present. Excess moisture will cause excessive premature leavening action during the agglomeration operation and thereby render the leavening agent partially or totally ineffective during the cooking or baking operation. Because the number of soluble agglutinates is limited in these mixes, when present in amounts of 3.5–15% it is preferable that the wetted particles be subjected to relatively violent or vigorous agitation while maintained in close proximity in order to increase the frequency of contact and the force of impact therebetween to successfully agglomerate these particles and form the tightly clustered agglomerates. If a mild form of agitation is employed such as that accomplised in a fluidized bed, the particles of mixtures of the type under consideration in the range of 3.5–15% soluble agglutinant cannot be successfully agglomerated on a commercial scale.

Also, in these mixes containing a low agglutinate content, the agglutinate or sugar should be ground to achieve maximum distribution and benefit from its presence, for as the percentage of the agglutinate in the mix decreases, the particle size of the agglutinate should also decrease. In the case of pancake and waffle mixes which will be elaborated on hereinafter, the sugar, which serves as the agglutinate is 100 microns or less in size to achieve maximum benefit. Once agglomeration of the wetted particles has been effected, they are subjected to a drying operation to remove excess moisture and rigidify and strengthen the agglomerates and remove the stickiness therefrom. The drying operation is preferably accomplished in rapid fashion by passing or blowing dry warm air through the agglomerated product while it is in an agitated or suspended condition to enable the agglomerates to receive maximum exposure to the drying air and thereby increase the efficiency of the removal of the moisture and improve the quality of the product and preserve the porous labyrinthian structure desired. The drying operation should be carefully controlled so as to avoid any significant gelatinization of the flour and the undesirable effects thereof, and is preferably conducted in such fashion that no gelatinization of any kind takes place.

Figure 1:
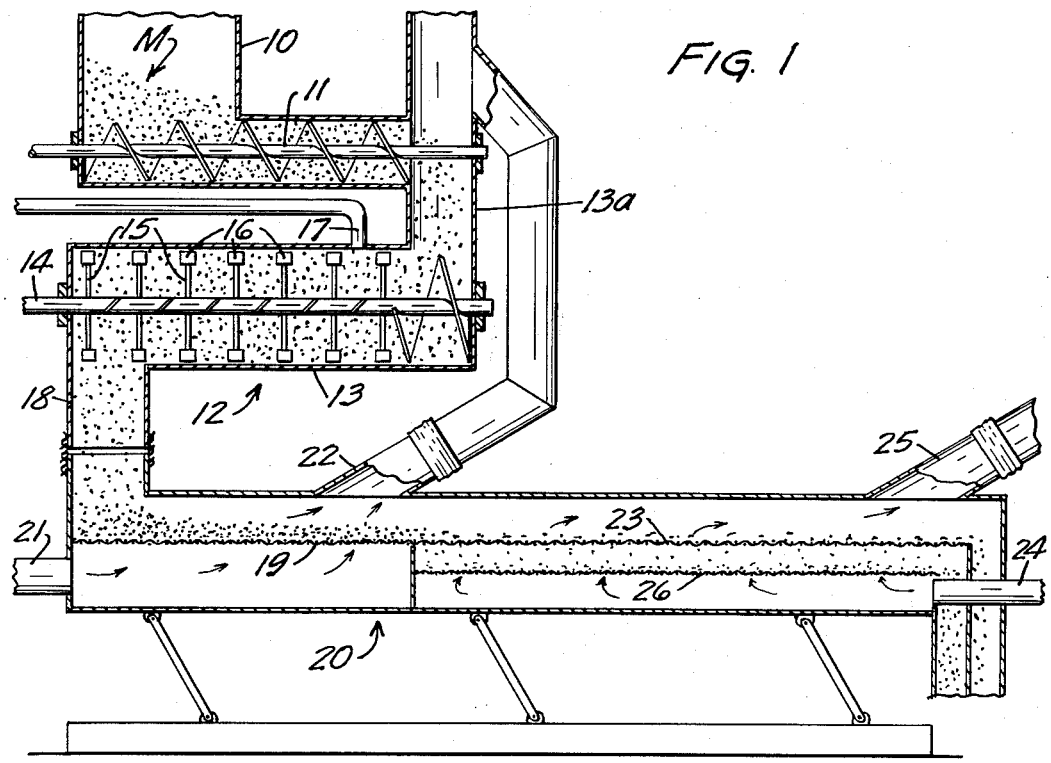

FIG. 1. illustrates one form of apparatus which has been successfully employed to effect the agglomeration of food mixes of the type under consideration. However, it should be clearly understood that the instant invention is in no way to be limited to the particular apparatus disclosed, said apparatus shown in the accompanying drawings being merely presented for illustrative purposes only and the instant invention includes within its scope any equipment or apparatus which is capable of wetting or moisturizing the particles to the extent desired and intimately dispersing and admixing them amongst one another in a humid atmosphere and bring them into contact with one another so as to effect the agglomeration desired.

The apparatus shown includes a source of material such as the hopper 10 from which the dry mix M which is to be agglomerated is fed into one end of a screw conveyor 11 which in turn uniformly delivers the mix to one end of a mixer 12 which includes a tube 13 having a feed chute 13a and which has mounted therewithin a mixing unit which consists of a rotary shaft 14 upon which is mounted a series of spirally arranged radially extending arms 15 having paddles 16 mounted on the ends thereof and angularly disposed with respect to the shaft so as to effect a turbulent agitation and thorough dispersion of the material therewithin and at the same time steadily conveys the material from one end of the mixer to the other to ultimately discharge the material therefrom in the desired agglomerated condition. To accomplishd the agglomeration desired, this agitator or mixer is operated at speeds on the order of 1000 to 2000 r.p.m. although agglomeration may be expected to take place in a broader range of speed of 500–3000 r.p.m. The dry material M fed to the mixer 12 from the screw conveyor is thoroughly dispersed in a moist humid atmosphere, preferably in the form of steam, which is injected into the tube 13 through a pipe 17 adjacent the inlet end of the mixer. The particles of the mix M are thoroughly dispersed in the steam at a temperature below the condensation temperature of the steam, thereby causing the steam to condense on the surface of the particles and cause a portion of the soluble agglutinate to go into solution and form an adhesive film or syrup on the surface of the agglutinating particles, namely, the sugar in most instances. The agitation and turbulence effected by the mixer brings all of the particles into repeated contact with one another and eventually causes the limited number of soluble agglutinating particles to combine together all of the particulate material of the mix in the form of porous agglomerates, similar to those shown in FIGS. 3 and 4.

As previously noted, the amount of moisture added must be carefully controlled so that an amount necessary to provide adhesive film from the soluble agglutinating (sugar) particles will be added. In the case of pancake and waffle mixes having sugar agglutinant present in the range of 3.5–15%, moisture in the form of steam should be added in the range of 0.1 to 0.50 pound of steam per pound of product, with the amount of condensed moisture added to the mixture ranging from .0075 to 0.06 pound per pound of product, much of the steam requirement not being utilized as condensed moisture but representing an excess necessary for the process and including operational losses. In any event, the moisture content of the mixture being agglomerated should not be increased beyond about 10%, and in most instances is preferably usually less and within the condensate range given above. Because of the criticality of moisture to be added, it is almost essential that the moisture be added in the form of humid air, water vapor or steam since it is much easier to control the amount of wetting when the moisture is added in the form of a condensate than it is when the particles are treated with moisture in liquid form. The relative proportion of soluble agglutinate binder to be present in the type of mix contemplated by this invention varies somewhat depending on the type of binder and the equipment to be employed in agglomerating the material. However, experience to date has shown that mixes most successfully agglomerated by the method set forth hereinabove and producing the type of agglomerates shown usually having a minimum of about 3.5% soluble agglutinant or binder such as sugar and a maximum of about 15% soluble sugar or binder. If a flour base mix has a readily soluble binder content of less than about 3.5%, the mix or the plain flour (whichever the case may be) has either insufficient functional agglutinants present or none at all, and must be agglomerated by a different method than that set forth herein and results in a different type of agglomerated material, which method and agglomerated structure is set forth in one of the aforementioned co-pending applications and involves glutenizing of the protein in the flour particles to a state of adhesion with the help of much larger amounts of moisture in excess of that capable of being used in the process of the instant disclosure to form agglomerates which are adhered together in penetrable agglomerates by the protein of the flour, which in effect is self-agglomerated, rather than by a readily soluble agglutinate as in the present invention. If the soluble sugar or binder content of the food mix is in excess of 15%, there usually is then sufficient agglutinate present in the mix to enable the material to be treated in a less agitated fashion to form a more loosely knit and lacy agglomerate and permits the use of still another method and apparatus for effectively accomplishing the agglomeration, which method and structure are set forth in one of the aforementioned co-pending continuations-in-part applications.

The method set forth in this disclosure and the resultant agglomerated product should not be confused with prior art methods of treating flour with moisture to effect wetting thereof such as the procedures set forth in the Anderson Patent 1,035,830 and Thomas Patent 1,010,202. In Anderson, for example, the flour is treated with moisture and heat to gelatinize the starch and effect a hard pebbled product which is totally incapable of being used in baked products such as pancakes and waffles due to the gelatinzation thereof and which in no way resembles a true agglomerate of the type contemplated by this invention. Thomas also does not agglomerate in any fashion but simply remoistens the milled flour with a portion of the moisture lost during the milling operation and discloses a procedure which would be totally incapable of forming agglomerates of the type contemplated and disclosed herein. The instant invention should also not be confused in any way with the product and method set forth in the Vernon Patent 1,155,977. The procedure set forth by Vernon consists in coating drops of water with particles of particulate material such as flour and subsequently drying the product and evaporating the moisture constituting the water drop to form a spherical mass which may consist of a hollow shell of aggregated particles defining or outlining a single large void or opening therebetween. Although this result may occur in some instances under very carefully controlled condition, experience has generally shown, through attempts to reproduce the aggregates of Vernon by the methods which he teaches in his aforementioned patent, that such a hollow aggregate of material is not produced but rather has resulted in the absorption of the flour particles by the water drop to form dense spherical lumps resembling snow balls which are relatively non-porous in nature. Neither the hollow shell structure nor the dense spherical masses resemble structurally or functionally the porous structure of the instant invention illustrated in FIGS. 3-4. Also, the method employed by Vernon is materially different from that herein disclosed and does not lead to the agglomerate structure of this invention. In our invention, the particles of the mixture to be agglomerated are thoroughly dispersed in a humid atmosphere to provide an adhesive film on the surface of the agglutinating particles and are then mixed and agitated at high speeds to bring the adhesive particles into contact with the mixture particles and combine them together into the agglomerates of this invention. Vernon simply drops or projects droplets of water into a mass or film of flour material, which droplets collect or are coated with the dry particles with which they come in contact as they pass through the apparatus and mass of flour, with no true dispersion in a humid atmosphere taking place and no vigorous agitation subsequent to dropping the water into the mass of flour.

After agglomeration has been effected in the mixer 12, the moist agglomerates are discharged therefrom through the chute 18 unto a screen 19 of a vibratory conveyor 20, and treated with heated dry air from a duct 21 which is passed through the moving agitated bed of agglomerates and discharged through the duct 22 for recirculation or exhaust, the heated air removing the excess moisture of the agglomerates thereby strengthening and rigidifying them and removing the stickiness therefrom.

After being dried, the agglomerates pass to the forward or leading end of the conveyor and from the screen 19 to the coarser screen 23 where they are optionally treated by cooling air entering through duct 24, passing through the bed of agglomerates and being discharged through the exhaust duct 25. As the agglomerates pass over the screen 23, they are screened for proper size, the product falling on the finer collection screen 26. Upon reaching the end of the vibratory conveyor, the product and over-sized agglomerates are discharged separately therefrom, as indicated. Examples of pancake and waffle mixes which have been successfully agglomerated by the process set forth herein to form the agglomerated structures shown in the accompanying drawings and also described therein are set forth as follows:

*Example I.—Pancake mix*

| | Percent |
|---|---|
| Major ingredients: | |
| Flour | 79.09 |
| Sugar | 9.67 |
| Minor ingredients: | |
| Wheat starch | 3.08 |
| Non-fat dry milk solids | 3.08 |
| Salt | 2.07 |
| Sodium bicarbonate | 1.72 |
| Acid leavening agent[1] | 1.29 |
| | 100.00 |

[1] Sodium aluminum phosphate, .85 percent; anhydrous monocalcium phosphate, .44 percent.

Before agglomeration, the moisture content of this pancake mix of Example I was 13.75%. The amount of moisture used for agglomeration of the mix was 0.17 pound of steam per pound of product, which resulted in the mix having a moisture content of 14.66% after agglomeration and prior to drying with a net increase in moisture content of the mix of .91%. The stabilized agglomerated product was then dried down to a moisture content of 8.25%, the temperature of the air used to accomplish the drying of the steamed product being on the order of 170° Fahrenheit. When forming the pancake mix into a batter, the rate of dispersion under identical condition was 15 seconds for the unagglomerated product and 10 seconds for the agglomerated product, the difference in effecting complete dispersibility of the mix in the liquid being improved by approximately 33%. It is important to further note that the agglomerated pancake mix produced a smooth batter in a much shorter period of time than that required for the same unagglomerated control mix. It was further observed that the viscosity of the batter of the agglomerated pancake mix was relatively constant over the normal usage time of 15 to 20 minutes. However, the viscosity of the unagglomerated pancake mix steadily increased over the same period of time. This feature of maintaining a more uniform viscosity over the normal usage time is important since the relatively constant viscosity of the agglomerated pancake mix enabled uniformly sized pancakes to be made much more easily with the agglomerated product than could be accomplished with the non-agglomerated batter since the changing viscosity of the unagglomerated batter caused the pancakes made by the unagglomerated batter to be smaller in diameter and thicker throughout as the viscosity increased.

*Example II.—Pancake mix*

| | Percent |
|---|---|
| Wheat flour | 52.25 |
| Sugar | 7.00 |
| Corn sugar | 2.00 |
| Milk Solids | 2.00 |
| Corn flour | 23.50 |
| Rye flour | 3.00 |
| Corn starch | 3.50 |
| Salt | 3.00 |
| Baking powder | 3.75 |
| | 100.00 |

This mix was agglomerated in the apparatus of FIG. 1, while operating at 1080 r.p.m. The mix was fed to the agglomerator at the feed rate of 8 pounds per minute, and agglomerated therein in the presence of steam fed to mixer at the rate of 2.1 pounds per minute. The agglomerates were dried in a stream of air having a temperature of 270° Fahrenheit. The loose bulk density of the control mix before agglomeration was 0.535 gm./cc., while after agglomeration the loose bulk density rose to 0.555 gm./cc. Conversely, the packed bulk density of the control unagglomerated starting material was .790 gm./cc., while the packed bulk density after agglomeration fell to .700 gm./cc.

*Example III.—Waffle mix*

| | Percent |
|---|---|
| Major ingredients: | |
| Flour | 72.00 |
| Shortening | 11.91 |
| Sugar | 5.57 |
| Minor ingredients: | |
| Starch | 2.97 |
| Salt | 1.99 |
| Non-fat dry milk solids | 1.49 |
| Sodium bicarbonate | 1.34 |
| Inorganic leavening agent: | |
| Sodium acid pyrophosphate | 1.49 |
| Cream of tartar | .74 |
| Monocalcium phosphate | .50 |
| | 100.00 |

In agglomerating the above waffle mix of Example III, 0.20 pound of steam was employed per pound of product. The moisture content before agglomeration was 12.10%. The moisture content of the mix after agglomeration but prior to drying was 13.06% resulting in a net increase in moisture content of the mix of .96 during the agglomeration. Drying air at a temperature of approximately 170° Fahrenheit was then employed to stabilize the agglomerates and reduce the moisture content thereof to about 7.85%. When mixing the above waffle mix into batter under the recommended standard conditions, it was observed that the rate of dispersion of the unagglomerated product was 60 seconds whereas the agglomerated product was completely dispersed in only 11 seconds, the unagglomerated control waffle mix taking approximately five and one-half times as long to be completely dispersed in the batter. It was also noted that the agglomerated waffle mix produced a much smoother batter in a shorter period of time than the unagglomerated mix and the same constant viscosity was observed as in the case of the pancake mix whereas the viscosity of the unagglomerated controlled waffle batter increased in viscosity during the normal usage period also as in the case of the pancake mix. The spreading characteristics of the waffle batter was observed to be constant over the period of time normally consumed in baking waffles from a batch of batter.

Although this disclosure has referred primarily to the use of sugar (such as sucrose) throughout as the agglutinate for the class of flour base product to which this invention applies, it is to be clearly understood that the invention is not to be limited to the use of sugar alone as the agglutinant or binder, and other ingredients, either alone or in combination with sugar or some other binding agent, may be employed, such as gelatin, for example, which, when mixed with flour in an amount of about 5% successfully agglomerated the flour in the manner taught herein and formed agglomerates characterized by dispersion times and bulk densities comparable to that obtained when sugar is employed as the agglutinant.

Although the process of agglomeration disclosed herein is most successfully applied to flour base mixes having readily soluble agglutinants such as sugar present in amounts ranging from about 3.5 to 15%, it also has useful applicability to those flour base mixtures having a high soluble agglutinant content present in amounts in excess of 15%. The same methods and apparatus may be employed as hereinbefore disclosed, with a tightly clustered agglomerate being formed as taught hereinbefore. However, when the soluble agglutinant is present in excess of 15% such vigorous agitation is not necessarily the preferred or only successful method of agglomerating the mixture as it is in those cases where the soluble agglutinant is present in the intermediate range of 3.5–15%. The high soluble agglutinant content tends to cause fouling of the type of apparatus and equipment shown in FIG. 1 of the instant disclosure which is necessary to the successful agglomeration of flour base mixtures having an intermediate amount of soluble agglutinant present. This problem may be alleviated by a somewhat different and less active method of agglomeration of flour base products having 15% or more soluble agglutinant present, resulting in a less dense porous agglomerate having a looser and lacier structure than the agglomerates of the instant invention, which method and resulting product is set forth in more detail in one of the aforementioned co-pending applications constituting a continuation-in-part of presently pending application S.N. 646,215. An example of material having more than 15% soluble agglutinant and agglomerated by the apparatus of FIG. 1 is as follows:

*Example IV.—Gravy mix*

|  | Percent |
|---|---|
| Flour | 79.671 |
| Salt | 11.932 |
| White pepper | 0.723 |
| Onion powder | 7.453 |
| Ground tumeric | 0.037 |
| Soluble paprika | 0.184 |
|  | 100.00 |

This material (in which the salt and onion powder function as soluble agglutinants) was fed to the agglomerator at a feed rate of 8 pounds per minute and agglomerated in an atmosphere of steam added to the mixer at a rate of 1.8 pounds per minute, the mixer operating at a speed of 1030 r.p.m., the agglomerate being dried in air having a temperature of 270° F. The loose bulk density of the unagglomerated control mix was 0.540 gm./cc., which figure was increased to 0.588 in the agglomerated material, the packed bulk density of the unagglomerated material being .953, that of the agglomerated material .690. As can be seen from the foregoing, the "high" content agglutinant material can be agglomerated on the more vigorous type of agitator to give a denser agglomerate. However, as the sugar content increases above 15%, the mixture being handled tends to increasingly cause fouling of the apparatus and decrease the efficiency of the operation.

From the foregoing, it can be seen that in the process of our invention each particle is supplied with surface moisture and can be made to adhere to other particles or agglomerates having wet sticky surfaces at will. It will be further seen and appreciated that the voids or air spaces in the agglomerated product of our invention are small in size and are very large in number and in proportion to the number of individual particles comprising each agglomerate, the combined effect of the large number and small size of the voids or air spaces being essential to effecting the mechanical air entrapment considered desirable in preparing batters from this type of agglomerated mixture. It will also be fully appreciated that in agglomerating a flour base mixture containing readily soluble agglutinates such as sugar in accordance with our invention, the amount of moisture added to the mixture during agglomeration must be carefully controlled to prevent over moisturization or wetting, the amount of moisture considered most desirable being that amount which will provide a sticky or adhesive film on the soluble agglutinates without dissolving the agglutinates themselves, or will provide a sticky film of dissolved soluble agglutinant on the other particles, and which will not glutinize the flour particles to any significant extent. Since the protein content of the flour particles requires more moisture to render them in a sticky or adhesive state than the readily soluble agglutinates such as sugar, those skilled in the art will appreciate that the flour base mixtures with which this invention is concerned can be most successfully agglomerated by controlling the moisture content to an amount which is sufficient to form a sticky adhesive film on the soluble agglutinates or other particles but of insufficient amount to cause any significant glutenizing of the proteins in the flour particles. Thus, the amount of moisture added in the process of this invention is considerably less than the amount of moisture necessary to glutenize the flour protein and agglomerate plain flour as set forth in the aforementioned co-pending application dealing with the subject.

Figure 2:
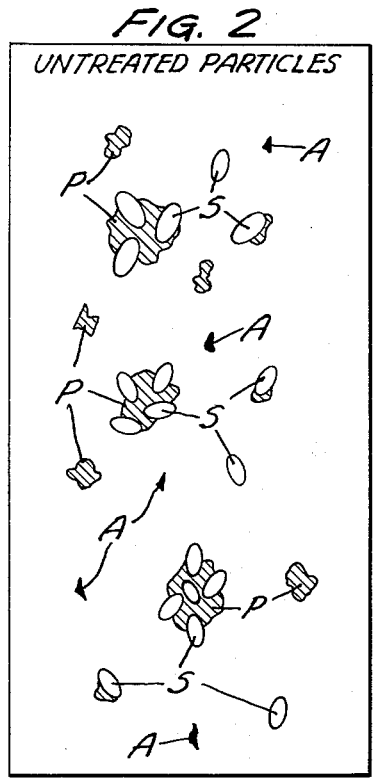
FIG. 2 is a schematic representation of an unagglomerated untreated mixture of flour and sugar.

Attention is now called to FIGS. 2 through 4 of the accompanying drawings which pictorially illustrate the agglomerates hereinbefore described in great detail.

FIG. 2 is a schematic presentation illustrating the appearance of an untreated unagglomerated mixture of approximately 95% flour and 5% sugar. The flour is shown with the majority thereof consisting of starch granules S in a mitrix of protein P, with some starch granules and protein standing individually apart. The soluble sugar agglutinant is referred to by the reference letter A.

FIG. 3 is a line drawing of a typical irregular porous agglomerate formed by our method from a mixture such as shown in FIG. 2 and as viewed under a microscope. The peaks or protruding portions (those nearest the viewer) of the agglomerate are represented by the darker stippled areas 30, and the particles further away from the viewer are represented by the lighter areas 40, with voids or openings between the particles being indicated by the reference letter V. The difficulty of bringing out the porous irregular nature of a non-symmetrical three dimensional agglomerate in a line drawing will be fully appreciated, and therefore the schematic cross-sectional view of FIG. 4 is offered as a further aid to understanding the nature of the agglomerates of our invention.

FIG. 5 is a cross-sectional view of a typical agglomerate such as that shown in FIG. 3 and more clearly sets forth the porous nature of the agglomerates and the interior structure and random arrangement of the particles. FIG. 4 shows the particles held or coupled together by the sugar A, either in the form of sticky particles A which formed an adhesive sticky solution on their surface when wetted, or the syrupy films A' which resulted from sugar so fine that the wetting thereof dissolved the sugar particles into the moisture to develop the film A'. The voids or air spaces V between and defined by the particles making up the agglomerate enable a liquid to rapidly penetrate to substantially all of the particles of the agglomerate to quickly wet them and dissolve the sugar bonds and disperse the particles in the liquid.

From the foregoing the advantages of our invention are readily apparent, and will be seen to have particular applicability to that group or class of flour base mixtures containing 3.5–15% soluble agglutinant, since it is by this method only that this class of material can be successfully agglomerated on a practical scale, whereas the flour base mixtures containing more than 15% soluble agglutinant can be successfully agglomerated by either the more vigorous agitation method of this invention or the gentler agitation method employing fluidization as set forth in our co-pending continuations-in-part, depending on the equipment available and the particular type of agglomerated structure desired.

From this disclosure it should be equally apparent that the method set forth makes the agglomeration of flour mixtures containing functional amounts of aggultinant such as sugar feasible and economical on a commercial scale. Also the agglomerated product resulting is dustless and permits volumetric measuring without sifting due to its granular structure, is wetted by and dispersed in a liquid much more rapidly than the unagglomerated material and without lumping and caking, and is strong enough to resist the strain of handling, packaging, etc.

It will, of course, be understood that various changes may be made in the form, detail, arrangement and proportion of the parts without departing from the scope of our invention which consists of the matter described herein and set forth in the appended claims.

What is claimed is:

1. A method of agglomerating dry powdery flour base material containing at least 3.5% functional soluble agglutinant into free flowing, dustless, readily wettable agglomerates comprising feeding the material to be agglomerated into one end of an elongate mixing chamber, providing a humid atmosphere in said chamber, dispersing and agitating said material in said chamber and moving it continuously therethrough to the other end thereof by means of a bladed mixer having blades which are spirally arranged and angularly disposed with respect to the axis of rotation and rapidly rotating at a rate of 500–3000 revolutions per minute whereby the dispersed particles are wetted and adhesive surfaces are formed on the particles of soluble agglutinants and the moisture content of the material is increased by not more than 10% and whereby the dispersed wetted particles are thrown together in random fashion to form agglomerates which are discharged from said other end of said chamber and have a loose bulk density not less than the loose bulk density of the starting material and drying said agglomerates.

2. The method of claim 1, wherein the material to be agglomerated contains not more than 15% soluble agglutinant.

References Cited by the Examiner

UNITED STATES PATENTS

| | | | |
|---|---|---|---|
| 1,035,830 | 8/1912 | Anderson | 99—93 |
| 1,155,977 | 10/1915 | Vernon | 99—93 |
| 2,832,686 | 4/1958 | Louder et al. | 99—56 |
| 2,835,586 | 5/1958 | Peebles | 99—56 |
| 2,856,290 | 10/1958 | Peebles | 99—83 |
| 2,893,871 | 7/1959 | Griffin | 99—56 |

A. LOUIS MONACELL, *Primary Examiner.*

TOBIAS E. LEVOW, ABRAHAM H. WINKLESTEIN,
*Examiners.*